US011438865B1

(12) United States Patent
Donnellan

(10) Patent No.: US 11,438,865 B1
(45) Date of Patent: Sep. 6, 2022

(54) SYSTEMS AND METHODS FOR LOCATION DETERMINATION OF BASE STATION FACILITIES AND MOBILE USER EQUIPMENT (UE) DEVICES IN A WIRELESS COMMUNICATION NETWORK

(71) Applicant: Verizon Patent and Licensing Inc., Basking Ridge, NJ (US)

(72) Inventor: Kevin Donnellan, North Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/204,576

(22) Filed: Mar. 17, 2021

(51) Int. Cl.
*H04W 64/00* (2009.01)
*H04W 4/02* (2018.01)

(52) U.S. Cl.
CPC ......... *H04W 64/003* (2013.01); *H04W 4/023* (2013.01); *H04W 4/025* (2013.01); *H04W 64/006* (2013.01)

(58) Field of Classification Search
CPC ........ G01S 19/43; G01S 19/071; G01S 19/41; G01S 17/86; G01S 17/42; G01S 19/05; G01S 19/073; G01S 19/42; G01S 19/45; G01S 19/51; G01S 5/0236; G01S 7/4808; G01S 11/06; G01S 13/42; G01S 13/882; G01S 19/52; G01S 5/0036; G01S 5/0054; H04W 4/029; H04W 4/40; H04W 64/00; H04W 4/02; H04W 4/021; H04W 64/006; H04W 4/023; H04W 64/003; H04W 36/0061; H04W 4/026; H04W 4/027; H04W 72/048

See application file for complete search history.

(56) References Cited

U.S. PATENT DOCUMENTS

| | | | |
|---|---|---|---|
| 2011/0090081 A1* | 4/2011 | Khorashadi | G01S 5/0252 340/539.13 |
| 2017/0026850 A1* | 1/2017 | Smith | H04W 4/16 |
| 2020/0322915 A1* | 10/2020 | Zhang | G01S 19/04 |
| 2021/0195479 A1* | 6/2021 | Wei | H04W 36/0055 |
| 2021/0385618 A1* | 12/2021 | Modarres Razavi | G01S 19/05 |

* cited by examiner

*Primary Examiner* — Kwasi Karikari

(57) ABSTRACT

An illustrative location management system obtains location data of one or more mobile user equipment (UE) devices communicatively coupled to a base station facility of a wireless communication network, obtains signal data representing information about signals communicated between the base station facility and the mobile UE devices by way of the wireless communication network, and determines, based on the signal data and the location data of the mobile UE devices, location data of the base station facility. In certain examples, the location data of the one or more mobile UE devices represents at least three different locations of the mobile UE devices to a sub-meter level of accuracy that is leveraged to determine a location of the base station facility to a sub-meter level of accuracy. Corresponding methods and systems are also described.

20 Claims, 11 Drawing Sheets

US 11,438,865 B1

SYSTEMS AND METHODS FOR LOCATION DETERMINATION OF BASE STATION FACILITIES AND MOBILE USER EQUIPMENT (UE) DEVICES IN A WIRELESS COMMUNICATION NETWORK

BACKGROUND INFORMATION

In a modern wireless communication network such as a cellular network, base station facilities send and receive wireless signals to/from mobile user equipment (UE) devices. Locations of the base station facilities are typically determined by survey, recorded, and used to determine locations of mobile UE devices that are communicatively coupled to the base station facilities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
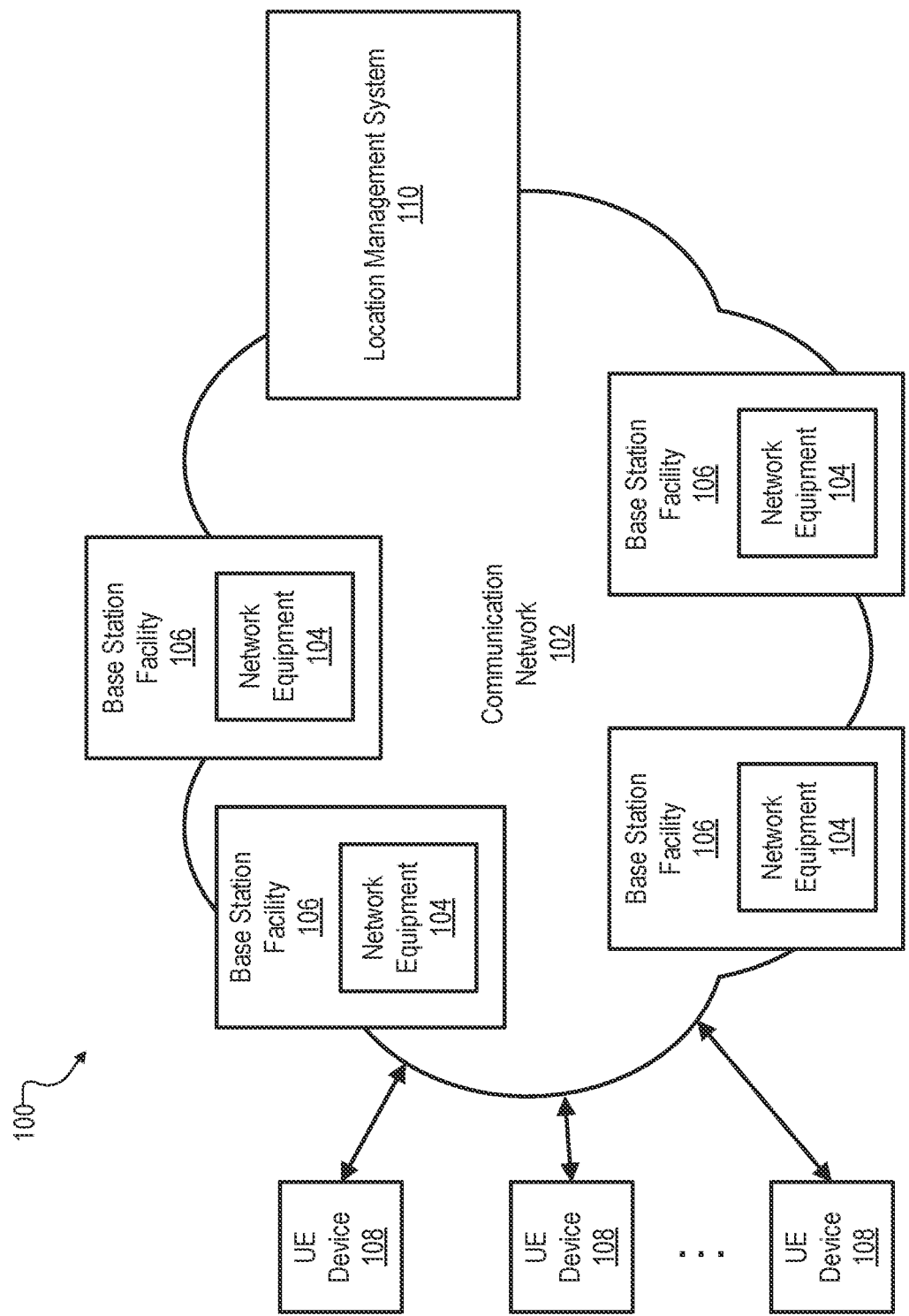
FIG. 1 shows an illustrative configuration of a communication network in which a location management system is implemented according to embodiments described herein.

Systems and methods for location determination of base station facilities (base stations) and UE devices in a wireless communication network (wireless network or communication network) are described herein. In certain examples, a wireless network may include some base stations having locations that are known to a first level of accuracy and other base stations having locations known to a second level of accuracy that is more accurate than the first level of accuracy, according to a predefined metric. For example, the wireless network may include a first set of base stations having locations that are unknown or are known to an accuracy of more than a meter (e.g., an accuracy of a few meters such as 3 meters) and a second set of base stations having locations that are known to a sub-meter level of accuracy. For instance, the second set of base stations may be equipped with a positioning technology such as real-time kinematic (RTK) positioning technology that is used to determine the locations of these base stations to the sub-meter level of accuracy. The first set of base stations may not be equipped with such positioning technology and, consequently, the locations of these base stations may be unknown or known only to an accuracy of more than a meter (e.g., by way of physical survey).

A sub-meter level of accuracy (e.g., any level of accuracy to within less than a meter) and a non-sub-meter level of accuracy (e.g., any level of accuracy to within a meter or more than a meter) are examples of different levels of accuracy in which one level of accuracy is more accurate or precise than another level of accuracy. Certain examples described herein are described in terms of a sub-meter level of accuracy and a less accurate level of accuracy such as a non-sub-meter level of accuracy. However, it will be understood that one or more of the principles described in terms of these illustrative levels of accuracy may also apply to other levels of accuracy in which one level of accuracy is more accurate than another level of accuracy. For example, a more accurate level of accuracy may include a level of accuracy to within less than a centimeter, a few or several centimeters (e.g., less than three, five, or ten centimeters), a meter, or a few or serval meters (e.g., less than three meters), and a less accurate level of accuracy may include any relatively less accurate level of accuracy.

More accurate (e.g., sub-meter accurate) location data may support or enable applications, services, features, etc. of the wireless network in ways that would not be enabled or supported by less accurate location data. Accordingly, it would be beneficial for the wireless network to have and use more accurate location data for base stations of the wireless network and mobile UE devices connected to the base stations. However, implementing positioning technology capable of providing more accurate location data on all base stations and/or re-surveying base stations not equipped with the positioning technology may be costly and/or impractical. In order to determine more accurate location data of base stations in the first set of base stations without the need for additional physical surveying or deployment of positioning technology to those base stations, a location management system may be configured to determine this more accurate location data for those base stations and mobile UE devices communicatively coupled to those base stations by leveraging more accurate location data of other mobile UE devices and base stations in the second set of base stations.

In certain examples, the location management system may use sub-meter accurate locations of one or more reference stations, which may include one or more of the base stations in the second set of base stations, to determine sub-meter accurate locations of mobile UE devices (e.g., mobile phones) communicatively coupled to those stations. The location management system may then use the sub-meter accurate locations of one or more the mobile UE devices to determine sub-meter accurate locations of one or more base stations that are in the first set of base stations and that are communicatively coupled to those mobile UE devices. For example, a base station in the first set of base stations may be communicatively coupled to one or more of the mobile UE devices. Based on sub-meter locations of these mobile UE devices, the location management system may determine a sub-meter accurate location of the base station. To illustrate, each of the mobile UE devices may communicate with the base station using various wireless signals, including reference signals. The location management system may obtain and use information from these signals in combination with sub-meter accurate locations of the mobile UE devices to calculate the sub-meter accurate location of the base station.

In some examples, the location management system may provide this sub-meter accurate location data of the base station for use by the location management system and/or other elements of the wireless network to determine sub-meter accurate locations of one or more additional mobile UE devices that are communicatively coupled to the base station (and at least two other base stations for which sub-meter location data is determined). For example, the location management system may use sub-meter accurate locations of at least three base stations to calculate a sub-meter accurate location of a particular mobile UE device communicatively coupled to those three base stations. The mobile UE device may communicate with each of the three base stations using wireless signals. The location management system may use information from the signals in combination with the sub-meter accurate locations of the three base stations to calculate the sub-meter accurate location of the mobile UE device.

In certain examples, the location management system may use sub-meter location data of at least three base stations and a mobile UE device communicatively coupled to the base stations to determine timing offsets between the base stations. For example, the location management system may determine estimated and measured signaling times from the mobile UE device to the base stations. The location management system may then determine differences between the estimated and measured signaling times, which differences are the timing offsets between the base stations. The location management system may be configured to use the timing offsets to correct timing synchronization errors when determining UE device locations.

In any of the ways described herein, systems and methods described herein may leverage precise locations of certain elements of a wireless communication to determine precise locations of other elements of the wireless communication network. The determined precise locations of elements of the wireless communication network may support and/or improve certain features, algorithms, and/or services (e.g., location-based services) of the wireless communication network that are configured to use such precise locations.

Various illustrative embodiments of the systems and methods will now be described with reference to the figures. The illustrative embodiments may provide one or more additional or alternative features and benefits that will be made apparent herein.

FIG. 1 shows an illustrative configuration 100 of a communication network 102 that includes network equipment 104 deployed at distinct base station facilities 106 (base stations 106) distributed throughout communication network 102. User equipment (UE) devices 108 and certain network equipment 104 may be communicatively coupled to one another such that UE devices 108 may request and receive one or more services by way of communication network 102 (e.g., from network equipment 104). Network equipment 104 may be configured to provide certain services to UE devices 108. Illustrative services may include, without limitation, network connectivity services, data communication services, and/or any services that use network connectivity and/or data communication. Examples of such services include, but are not limited to, data streaming services, mobile application services, software-as-a-service services, platform-as-a-service services, infrastructure-as-a-service services, multi-access server services (e.g., cloud computing services and/or multi-access edge computing (MEC) services), communication services, and digital content delivery services.

Each UE device 108 may be implemented as any computing device configured to connect to communication network 102 and to request and/or receive services by way of communication network 102, such as services provided by network equipment 104 by way of communication network 102. A UE device 108 may be implemented as a personal computer (e.g., a laptop computer, etc.) or a mobile device (e.g., a smartphone or tablet device, etc.), for example, and may be controlled by a user of the UE device 108. In certain examples, UE devices 108 include mobile UE devices configured to wirelessly communicate with network equipment 104 deployed at base stations 106 using any suitable wireless communication technologies (e.g., radio access network technologies, 5G technologies, 4G technologies, etc.).

Each instance of network equipment 104 deployed at a base station facility 106 may include or be implemented by a computing system (e.g., a server, a blade server, an edge server, a set of servers at a single site, etc.) that includes a set of computing resources (e.g., memory, processing, throughput, latency, and/or other computing resources). The computing resources may include and/or may be provided using a combination of hardware and software resources.

Network equipment 104 may represent various types of network equipment deployed throughout communication network 102. For example, network equipment 104 may include routers, gateways, hubs (e.g., CRAN and/or DRAN hubs), radio transceivers, antennas, satellite positioning receivers (e.g., global positioning systems (GPS) and/or RTK positioning systems), radio access network (RAN) equipment, servers, and/or any other types of network equipment. In certain examples, certain network equipment 104 includes multi-access servers that are each accessible to multiple UE devices 108 and configured to perform processing and data services for the UE devices 108. Such multi-access servers may include multi-access edge compute (MEC) servers implemented within a provider network of communication network 102 (e.g., near the edge of communication network 102 where UE devices 108 connect to the network) and/or other multi-access servers (e.g., cloud servers) implemented farther from the edge of the provider network (e.g., within external networks that are accessible to UE devices 108 by way of the provider network).

Communication network 102 may represent various networks or parts of networks used to enable communication between UE devices 108 and network equipment 104. To this end, communication network 102 may implement or employ any suitable communication technologies, devices, media, protocols, or the like as may serve a particular implementation. In some examples, communication network 102 may include a provider network and/or additional networks outside of the provider network (e.g., external networks associated with the Internet).

A provider network included within communication network 102 may be implemented as a provider-specific wired or wireless communications network (e.g., a cellular network used for mobile phone and data communications, a 4G and/or 4.5G Long Term Evolution (LTE) mobile network, a 5G network or a network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control the elements necessary to deliver communication services to UE devices 108, including radio spectrum allocation, wireless network infrastructure, back haul infrastructure, customer care, provisioning of devices, and so forth.

As mentioned, network equipment 104 is deployed at distinct base station facilities 106 distributed throughout communication network 102. Base station facilities 106 are located at network sites at different geographic locations. The different geographic locations may be any locations suitable for deployment of network equipment 104 to support operation of communication network 102. Base station facilities 106 may include any structures that house (e.g., enclose, support, etc.) network equipment 104. For example, base station facilities 106 may include buildings, towers, etc. at which network equipment 104 is deployed.

Location management system 110 (system 110) may be configured to manage location data that indicates locations of base station facilities 106 and UE devices 108 of communication network 102. The management of the location data may include system 110 performing one or more operations related to the locations of base station facilities 106 and UE devices 108, including for example obtaining, determining, storing, providing, and/or using location data representing geographic locations of base station facilities 106 and UE devices 108. Such location management by system 110 may facilitate network equipment 104 providing and UE devices 108 accessing one or more services of communication network 102, including one or more services that are provided and/or accessed based on the locations of based station facilities 106 and/or UE devices 108.

System 110 may be implemented in any suitable way. As an example, system 110 may be implemented as a computing system separate from and communicatively coupled to base station facilities 106, UE devices 108, other elements of communication network 102, and/or any other computing devices connected to communication network 102. As another example, system 110, or at least portions of system 110, may be implemented by any of base station facilities 106, other elements of communication network 102, and/or any other computing devices connected to communication network 102.

Figure 2:
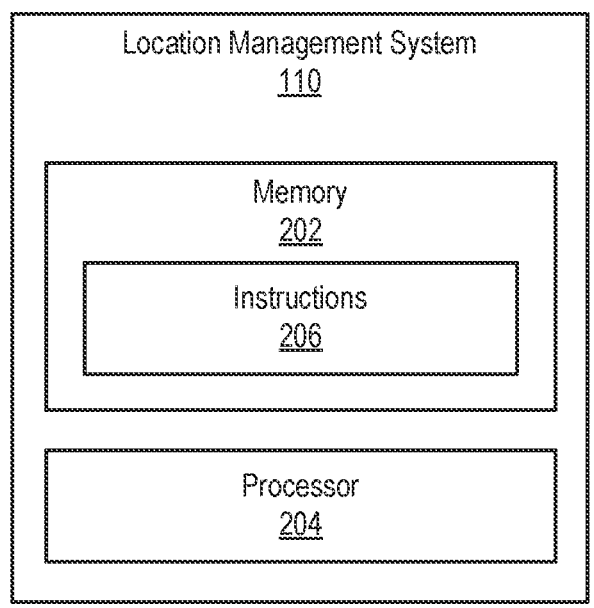
FIG. 2 shows an illustrative location management system according to embodiments described herein.

FIG. 2 shows illustrative components of location management system 110 configured to perform one or more of the operations described herein. As shown, system 110 may include, without limitation, a memory 202 and a processor 204 selectively and communicatively coupled to one another. Memory 202 and processor 204 may each include or be implemented by computer hardware that is configured to store and/or execute computer software. Various other components of computer hardware and/or software not explicitly shown in FIG. 2 may also be included within system 110. In some examples, memory 202 and processor 204 may be distributed between multiple devices and/or multiple locations.

Memory 202 may store and/or otherwise maintain executable data used by processor 204 to perform any of the functionality of system 110 described herein. For example, memory 202 may store instructions 206 that may be executed by processor 204. Memory 202 may be implemented by one or more memory or storage devices, including any memory or storage devices described herein, that are configured to store data in a transitory or non-transitory manner. Instructions 206 may be executed by processor 204 to cause system 110 to perform any of the functionality of system 110 described herein. Instructions 206 may be implemented by any suitable application, software, code, and/or other executable data instance. Additionally, memory 202 may also maintain any other data accessed, managed, used, and/or transmitted by processor 204.

Processor 204 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 204 (e.g., when processor 204 is directed to perform operations represented by instructions 206 stored in memory 202), system 110 may perform functions associated with location management as described herein and/or as may serve a particular implementation.

Figure 3:
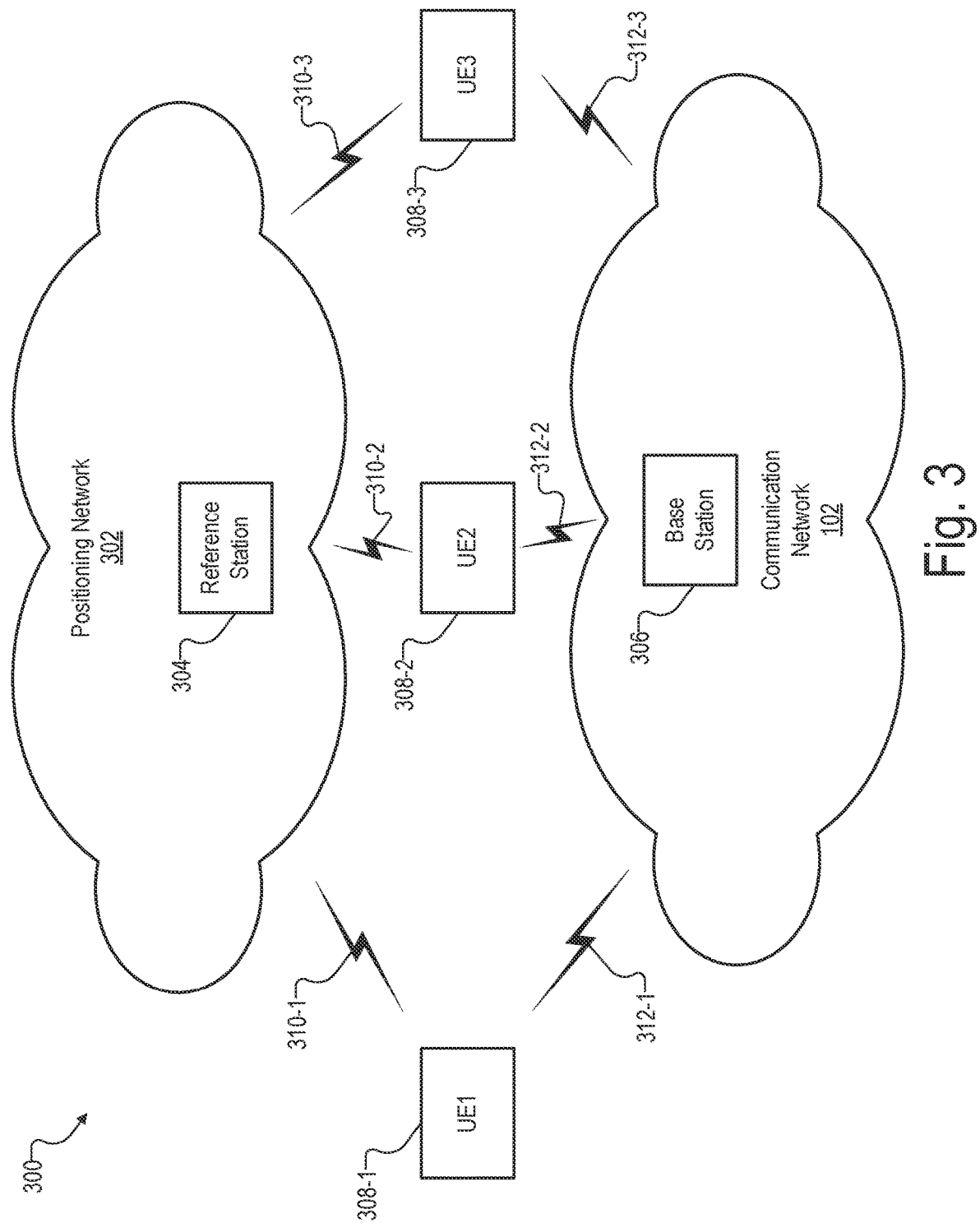
FIG. 3 shows an illustrative configuration for which a location management system may perform location management operations according to embodiments described herein.

FIG. 3 shows an illustrative configuration 300 for which system 110 may perform one or more location management operations. As shown, configuration 300 may include communication network 102 and a positioning network 302. Positioning network 302 may include a reference station facility 304 (reference station 304), communication network 102 may include a base station facility 306 (base station 306), and certain mobile UE devices 308-1, 308-2, and 308-3 (collectively UE devices 308) may be communicatively coupled to positioning network 302 and communication network 102. For example, UE devices 308 may be communicatively coupled to reference station facility 304 and base station facility 306.

Positioning network 302 may represent one or more positioning networks or parts of one or more positioning networks configured to be used to determine geographic locations of devices communicatively coupled to the positioning network(s), such as the geographic locations of UE devices 308 communicatively coupled to positioning network 302. To this end, positioning network 302 may employ any suitable positioning technologies, devices, protocols, or the like as may serve a particular implementation. In certain examples, reference station facility 304 and/or other elements of positioning network 302 may employ one or more satellite-based positioning technologies such as GPS and/or RTK positioning systems.

Reference station facility 304 may be a stand-alone reference station facility or may be co-located at a base station facility 106 of communication network 102. Reference station facility 304 may be equipped with hardware and/or software configured to provide and/or access one or more positioning technologies of positioning network 302. Reference station facility 304 may be deployed in any suitable way, including as a ground-based station at a fixed geographic location and/or as an aerial station (e.g., on a satellite or aerial vehicle). While FIG. 3 shows positioning network 302 with one reference station facility 304 and certain examples are described herein with reference to the reference station facility 304, positioning network 302 may have multiple reference station facilities dispersed at different locations throughout positioning network 302 and configured to provide and/or access one or more positioning technologies of positioning network 302.

UE devices 308 may include any UE devices configured to communicatively couple to positioning network 302 and communication network 102. In certain examples, UE devices 308 are mobile UE devices (e.g., mobile phones, mobile IoT devices, etc.) configured to communicatively couple to both communication network 102 and positioning network 302. UE devices 308 may be equipped with one or more positioning technologies of positioning network 302. Accordingly, UE devices 308 may communicate with one or more reference station facilities, such as reference station facility 304, of positioning network 302.

Positioning network 302 may enable the sending and receiving of positioning signals between reference station facility 304 and UE devices 308. In certain examples, positioning network 302 may use radio technologies (e.g., UHF, VHF, spread spectrum, etc.) to send and receive positioning signals. For example, reference station facility 304 and UE devices 308 may each include positioning technology transmitters and/or receivers (e.g., satellite positioning technology transmitters and/or receivers) that can communicate positioning signals 310-1, 310-2, 310-3 (collectively positioning signals 310) between reference station facility 304 and UE devices 308. The positioning signals 310 may be used by UE devices 308 and/or system 110 to determine geographic locations of UE devices 308.

Reference station facility 304 and/or UE devices 308 may be compatible with various (e.g., multiple) positioning technologies to enable a determination of geographic locations of UE devices 308 to various degrees of accuracy. For example, UE devices 308 may be configured with GPS capability and may have location data determined to an accuracy of tens of meters (e.g., ten or more meters) by way of a GPS positioning network.

In addition, reference station facility 304 and UE devices 308 may be configured for RTK positioning capability and may have location data determined to a sub-meter degree of accuracy (e.g., less than one meter) by way of a RTK positioning network. As such, when UE devices 308 having RTK capability communicate with reference station facility 304 via positioning signals 310, UE devices 308 and/or system 110 may have the ability to determine the geographic locations of UE devices 308 to a sub-meter degree of accuracy.

While reference station facility 304 and UE devices 308 may have locations that are determined to a sub-meter level of accuracy by way of GPS and RTK positioning technologies, base station facility 306 may not be equipped with such positioning technologies and its location may not be known to a sub-meter level of accuracy. For example, base station facility 306 may be a legacy base station that is not equipped with a sub-meter accurate positioning technology such as RTK technology, and the location of the base station may be unknown or known only to within several meters of accuracy by way of a survey conducted for the base station. However, it may be desirable to determine, with greater accuracy, the location of base station facility 306 such that the location of the base station facility 306 may be used to provide, improve, or otherwise support services that use a greater level of accuracy.

System 110 may be configured to determine the location of base station facility 306 to such a level of accuracy, which may be at least a sub-meter level of accuracy in certain examples. For example, system 110 may obtain and use location data for UE devices 308 that is accurate to a sub-meter level of accuracy to determine location data for base station facility 306 to the same level of accuracy.

To illustrate, base station facility 306 may be communicatively coupled to UE devices 308 by way of communication signals 312 (e.g., to UE device 308-1 by way of communication signals 312-1, to UE device 308-2 by way of communication signals 312-2, and to UE device 308-3 by way of communication signals 312-3). Communication signals 312 may include any suitable signals supported by communication network 102, such as 4G, 5G, or any other suitable radio signals. Communication signals 312 may include defined reference signals of 4G, 5G, or other wireless communication technology.

System 110 may determine that UE devices 308 are or were concurrently coupled to base station 306 and that location data representing the locations of the UE devices 308 when concurrently coupled to the base station 306 has at least a threshold level of accuracy, such as a sub-meter level of accuracy. For example, at a particular time (e.g., any suitable point in time) UE devices 308 may be concurrently coupled to base station 306 by way of communication signals 312 and may have locations that are known or can be determined to the sub-meter level of accuracy. For that time, system 110 may use the sub-meter accurate locations of UE devices 308 and information from communication signals 312 between the UE devices 308 and base station 306 to determine a sub-meter accurate location of base station 306.

To this end, system 110 may obtain UE device location data representing the locations of UE devices 308 to a sub-meter level of accuracy and signal data representing communication signals 312 between base station facility 306 and UE devices 308. Based on the location data and the signal data, system 110 may determine a geographic location of base station facility 306 to a sub-meter level of accuracy. Examples of how system 110 may use the location data and the signal data to determine the geographic location of base station facility 306 are described herein.

Figure 4:
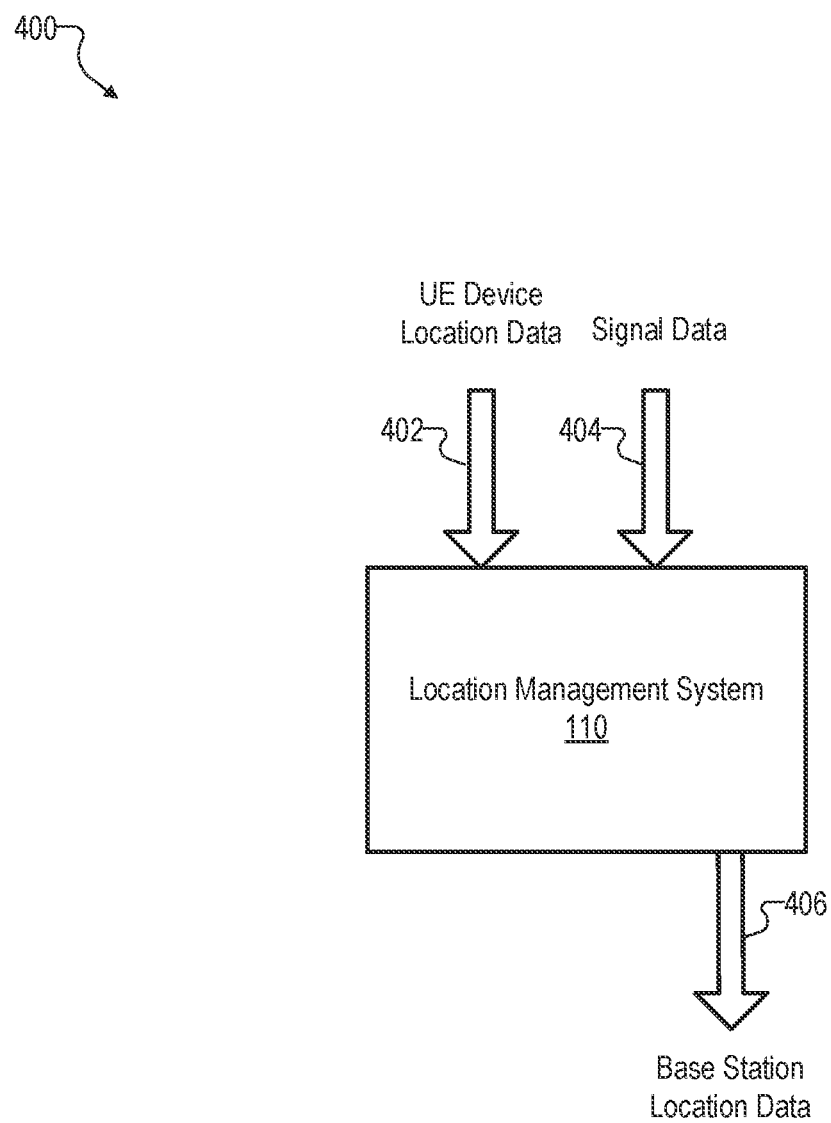
FIG. 4 shows illustrative data received and output by a location management system according to embodiments described herein.

FIG. 4 shows an illustrative diagram 400 of system 110 obtaining and outputting illustrative data. As shown, system 110 may obtain two illustrative examples of input data—UE device location data 402 and signal data 404. System 110 may use UE device location data 402 and signal data 404 to perform one or more location data determination operations, such as determining base station location data 406 for base station facility 306.

UE device location data 402 may represent geographic locations of UE devices 308 at one or more points in time (e.g., geographic locations of UE devices 308 at a time at which UE devices 308 are communicatively coupled to base station 306). In certain examples, at least some UE device location data 402 may indicate real-time information about the current geographic locations of UE devices 308. Such real-time information may represent real-time location coordinates of UE devices 308 at approximately a moment in time that the current geographic locations of UE devices 308 are obtained by system 110. In these examples, system 110 may obtain UE device location data 402 in real-time, which may mean that UE device location data 402 is obtained immediately and without undue delay, even if it is not possible for there to be absolutely zero delay. In certain examples, UE device location data 402 may additionally or alternatively include information about historical geographic locations of UE devices 308 (e.g., locations of UE devices 308 at one or more previous points in time).

System 110 may be configured to obtain UE device location data 402 from any suitable source(s). For example, system 110 may be configured to obtain UE device location data 402 from any computing system with which system 110 may communicate (e.g., by way of communication network 102 or another network), including network equipment 104, UE devices 108 (e.g., by way of communication signals 312 or other signals provided by UE devices 108), base station facility 306, elements of positioning network 302, elements of communication network 102, computing systems associated with monitoring performance of communication network 102, and/or any other computing system from which UE device location data 402 representing geographic locations of UE devices 108 may be obtained.

Signal data 404 may represent any information from communication signals 312 transmitted and received between base station facility 306 and UE devices 308. For example, signal data 404 may indicate times associated with transmission and/or reception of communication signals 312, such as one or more measurements of time periods that elapse between transmission and receipt of communication signals 312. In certain examples, communication signals 312 may be bidirectional between base station facility 306 and UE devices 308, may be unidirectional from base station facility 306 to UE devices 308, or may be unidirectional from UE devices 308 to base station facility 306.

Communication signals 312 may include different or various types of communication signals 312 (e.g., reference signals) depending on technologies implemented by base station facility 306 and UE devices 308. For example, in a 4G network, communication signals 312 may include reference signals such as positioning reference signals (PRS) and/or timing advanced (TA) signals while, in a 5G network, communication signals 312 may include reference signals such as service or sounding reference signals (SRS). These reference signals are illustrative only. Any suitable signals of any suitable wireless communication technology may be used in other examples.

System 110 may be configured to obtain signal data 404 from any suitable source(s). For example, system 110 may be configured to obtain signal data 404 from UE devices 308 and/or from any computing system with which system 110 may communicate (e.g., by way of communication network 102 or another network). As another example, system 110 may be configured to obtain signal data 404 by deriving signal data 404 from other data received by system 110. Accordingly, system 110 may obtain signal data 404 by receiving the data from one or more suitable sources and/or by generating the data based on data received from one or more suitable sources.

After obtaining UE device location data 402 and signal data 404, system 110 may determine base station location data 406 for base station facility 306. In certain examples, system 110 may receive UE device location data 402 and signal data 404 having a sub-meter level of accuracy and may determine, based on UE device location data 402 and signal data 404, base station location data 406 that represents a geographic location of base station facility 306 to a sub-meter level of accuracy. For example, system 110 may receive UE device location data 402 for at least three RTK-enabled mobile UE devices 308 and signal data 404 from communication signals 312 corresponding to reference signals communicated between the at least three mobile UE devices 308 and base station facility 306. In this example, system 110 may be able to determine, based on the received UE device location data 402 and signal data 404, base station location data 406 to a sub-meter level of accuracy such as an accuracy level within a few centimeters (e.g., less than five centimeters) when the reference signals include 5G new radio (NR) SRS signals (NR-SRS). As another example, system 110 may receive UE location data 402 that indicates at least three locations of an RTK-enabled mobile UE device 308 at different times when the mobile UE device 308 is communicatively coupled to base station facility 306. System 110 may also receive signal data 404 representing information from communication signals 312 corresponding to reference signals communicated between the base station facility 306 and the UE device 308 at those locations. In this example, system 110 may be able to determine, based on the received UE device location data 402 and signal data 404, base station location data 406 to a sub-meter level of accuracy such as an accuracy level within a few centimeters (e.g., less than five centimeters) when the reference signals include 5G new radio (NR) SRS signals (NR-SRS). Other examples may use any combination of one or more RTK-enabled mobile UE devices 308 for which at least three different locations are determined when the one or more mobile UE devices 308 are communicatively coupled to base station facility 306.

Figure 5:
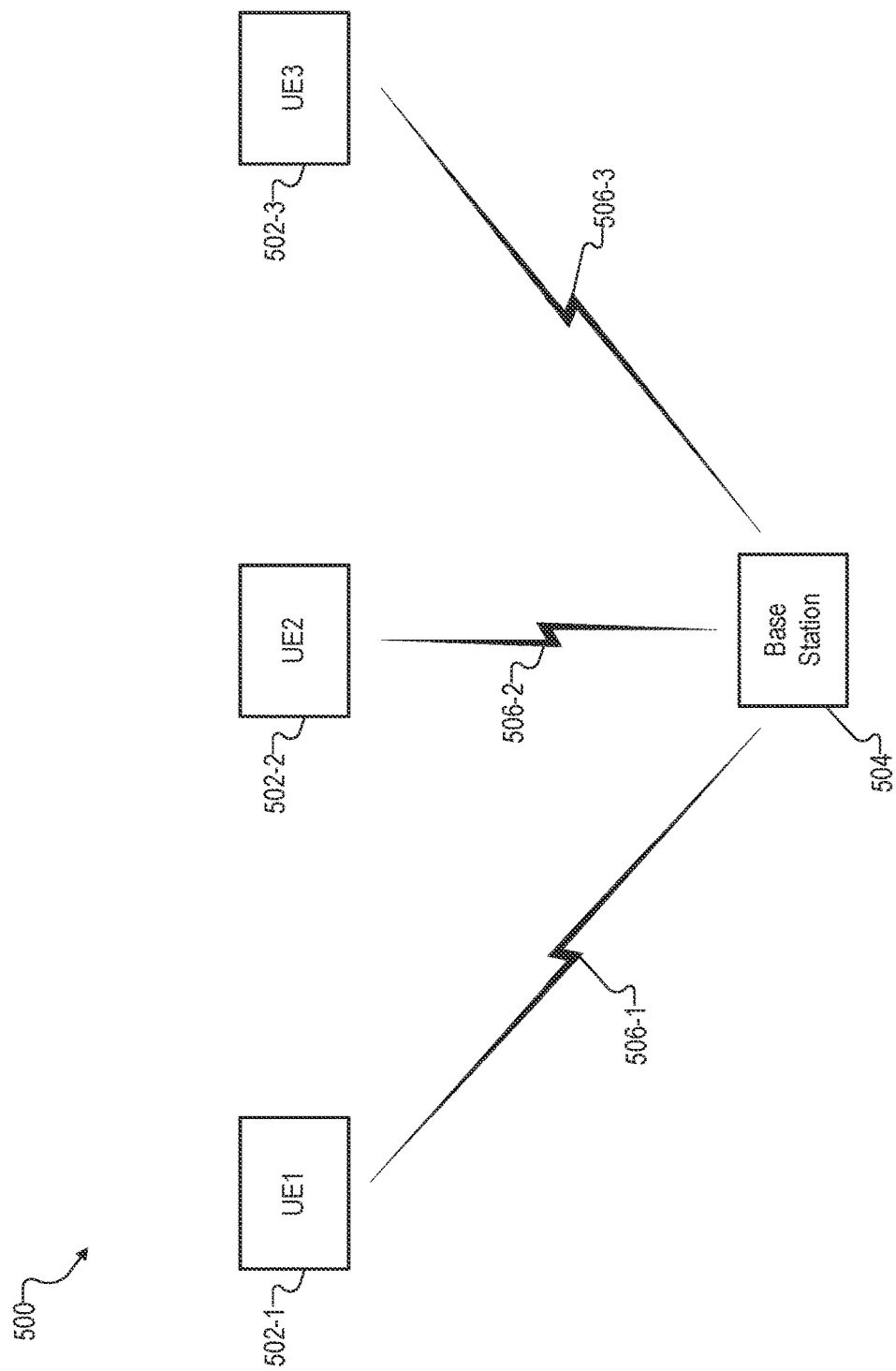
FIG. 5 shows an illustrative configuration for which a location management system may determine a location of a base station facility according to embodiments described herein.

Examples of how system 110 may determine a location of a base station (e.g., base station 306) based on the locations of UE devices (e.g., UE device 308) and communication signals (e.g., communication signals 312) between the base station and the UE devices will now be described with reference to FIG. 5. FIG. 5 shows an illustrative configuration 500 of certain UE devices 502-1, 502-2, and 502-3 (collectively UE devices 502) communicatively coupled to a certain base station facility 504. In the illustrated example, UE devices 502-1, 502-2, and 502-3 communicate with base station facility 504 by way of communication signals 506-1, 506-2, 506-3, respectively (collectively communication signals 506). Such communications may be by way of communication network 102. In certain embodiments, communication network 102 may include a 5G network, and UE devices 502 may be 5G-enabled and RTK-enabled mobile UE devices for which UE device location data has been determined to a sub-meter level of accuracy.

In the embodiment shown, a geographical location of base station facility 504 is initially not known to a sub-meter level of accuracy. System 110 may obtain location data representing the locations of UE devices 502 to a sub-meter level of accuracy and signal data representing information from communication signals 506 and, based on the data, determine a geographical location of base station facility 504 to within a sub-meter level of accuracy.

In certain examples, system 110 may be configured to determine timing information associated with communication signals 506, use the timing information to determine distances between base station facility 504 and UE devices 502, and use the distances together with the locations of the UE devices 502 to determine a location of base station facility 504 by way of trilateration. System 110 may determine timing information associated with communication signals 506 in any suitable way. For example, system 110 may be configured to use algorithms such as a multi-Round Trip Time (mRTT) algorithm, a downlink time difference of arrival (DL-TDOA) algorithm, and/or an uplink time difference of arrival (UL-TDOA) algorithm to determine timing information associated with reference signals such as 5G reference signals (e.g., SRS, PRS, etc.). System 110 may be configured to use the timing information in a trilateration process to determine a location of base station facility 504.

To illustrate, location management system 110 may obtain sub-meter-accurate location data for each of UE devices 502 (e.g., x, y, z coordinates). For example, location data for UE device 502-1 may be represented as $x1, y1, z1$, location data for UE device 502-2 may be represented as $x2, y2, z2$, and location data for UE device 502-3 may be represented as $x3, y3, z3$.

System 110 may also obtain timing measurements for each of communication signals 506, such as by using a mRTT algorithm, a DL-TDOA algorithm, and/or a UL-TDOA algorithm. System 110 may use the timing measurements to determine a distance between each of UE devices 502 and base station facility 504. For example, a distance D1 between UE device 502-1 and base station facility 504 may be represented as: $D1=RTT1*C/2$, where RTT is a round-trip time of a signal and C is the speed of light. A distance D2 between UE device 502-2 and base station facility 504 and a distance D3 between UE device 502-3 and base station 504 may be determined in the same way.

Based on the locations of UE devices 502 and the determined distances D1, D2, D3 between UE devices 502 and base station facility 504, system 110 may determine base station location data (e.g., x, y, z coordinates) representing a location of base station facility 504 to the sub-meter level of accuracy using trilateration. For example, system 110 may solve the following equations to determine the base station location data (e.g., x, y, z coordinates) of base station facility 504:

$$(x-x1)^2+(y-y1)^2+(z-z1)^2=D1^{*2}$$

$$(x-x2)^2+(y-y2)^2+(z-z2)^2=D2^{*2}$$

$$(x-x3)^2+(y-y3)^2+(z-z3)^2=D3^{*2}.$$

System 110 may be configured to determine the location of base station facility 504 based on locations of UE devices 502 and communication signals 506 between base station facility 504 and UE devices 502 in other suitable ways. For example, system 110 may determine one or more angles associated with communication signals 506, such as angles of arrival (AOA) and/or angles of departure (AOD) of communication signals 506 using downlink angle of departure (DL-AOD) and/or uplink angle of arrival (UL-AOA) algorithms. System 110 may then use the determined angles to determine a location of base station facility 504 using a triangulation process.

As another example, system 110 may be configured to use a combination of arrival/departure angles and signal timing measurements or distances determined from signal timing measurements to determine base station location data of base station facility 504. For example, system 110 may determine the angles of departure of communication signals 506 using a DL-AOD algorithm and, based on signal timing measurements of communication signals 506, distances between base station facility 504 and UE devices 502. System 110 may then use any suitable combination of the angles of departure of communication signals 506 and the distances to determine a location of base station facility 504.

The level of accuracy of the location of base station facility 504 determined by system 110 may depend on a number of factors, including the type of communication signals 506 used, the accuracy of timing measurements of communication signals 506, and the accuracy of the locations of UE devices 502. For example, timing measurements of PRS and/or TA signals may be used to determine distances that are accurate to a degree of tens of meters (e.g., ten or more meters) while timing measurements of SRS signals may be used to determine distances that are accurate to a sub-meter degree of accuracy (e.g., less than one meter). In certain examples, timing measurements of communication signals may be used to determine distances that are accurate to one or more centimeters of accuracy (e.g., less than ten centimeters), such as when both uplink and downlink timing measurements are used.

In certain examples, PRS signals are positioning reference signals used in 4G and 5G communications for location services. A UE device may receive PRS signals from neighbor cells and report back the received signal time different (RSTD) for each neighbor to communication network 102 (e.g., to system 110 and/or to one or more elements of communication network 102) for use to determine the location of the UE device.

In certain examples, the TA signals are timing advance signals in 4G communications that communication network 102 measures to determine the time a signal takes to reach a UE device from a serving cell. This signal may be used to determine the distance to the UE device.

In certain examples, the SRS signals are source reference signals used in 4G and 5G communications for channel quality measurements and positioning. An SRS signal is sent from a UE device to communication network 102 (e.g., to system 110 and/or to one or more elements of communication network 102). Neighbor cells receive the signal and report times associated with the signal to a location-based service (LBS). The LBS computes a location of the UE device from time differences between the neighbor cells' receipt of the signal.

While the example illustrated in FIG. 5 is described in terms of using the locations of three UE devices 502 to determine a location of base station facility 504, in other examples, locations of any suitable number of UE devices 502 may be used by system 110 to determine location of base station facility 504. As an example, at least three different locations of a single UE device (e.g., UE device 502-1) from which the UE device is communicatively coupled to base station facility 504 at different points in time may be used by system 110 to determine the location of base station facility 504. As another example, a location of one UE device from which the UE device is communicatively couple to base station facility 504 and at least two different locations of another UE device from which the other UE device is communicatively coupled to base station facility 504 at different points in time may be used by system 110 to determine the location of base station facility 504.

System 110 may be configured to provide base station location data representing the location of base station facility 504 determined by system 110 for use in determining a location of an additional UE device that is communicatively coupled to base station facility 504. This may include system 110 storing the base station location data to memory for subsequent use by system 110 and/or system 110 providing the base station location data to a location determining process or to any other destination for use in determining a location of an additional UE device that is communicatively coupled to base station facility 504.

Figure 6:
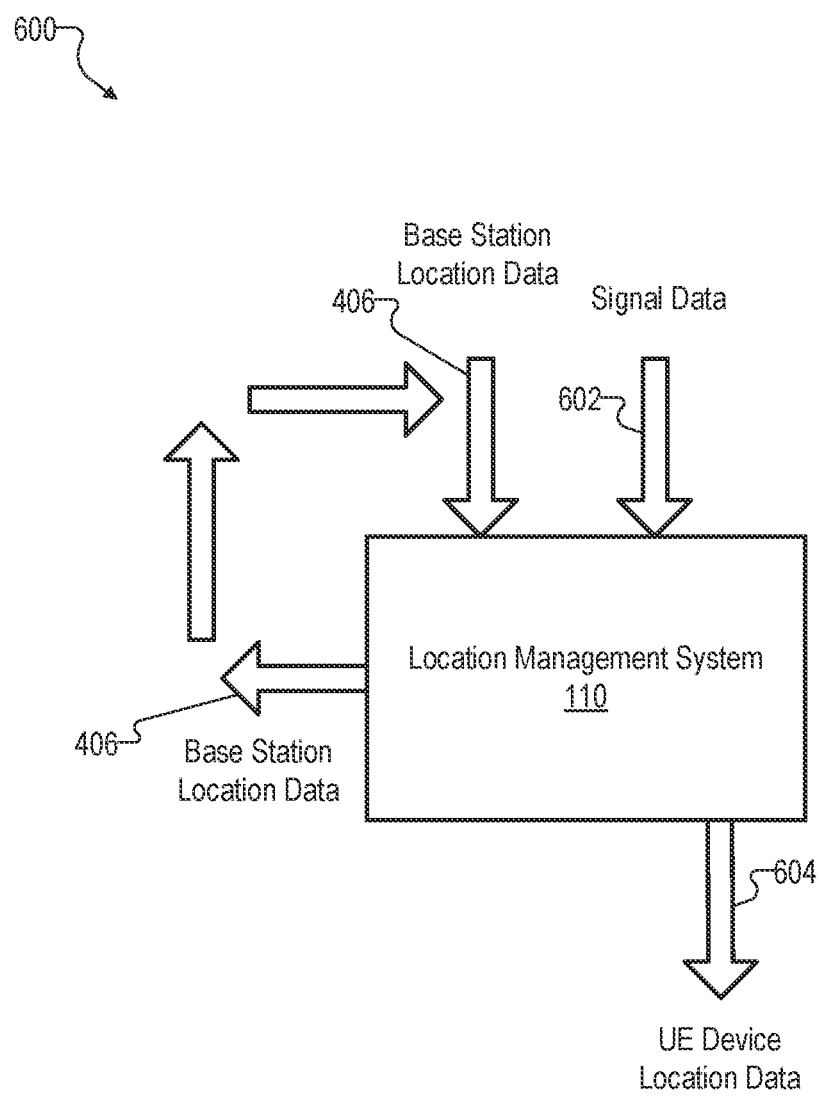
FIG. 6 shows illustrative data received and output by a location management system according to embodiments described herein.

FIG. 6 shows an illustrative diagram 600 of system 110 obtaining two illustrative examples of input data—base station location data 406 and signal data 602. System 110 may use base station location data 406 and signal data 602 to perform one or more location data determination operations, such as determining UE device location data 604 representing a location of an additional UE device.

In the embodiment shown, base station location data 406 is the same base station location data 406 determined and provided by system 110 as described above. That is, system 110 may determine and provide base station location data 406 for use by system 110 to determine additional UE device location data 604 representing a location of an additional UE device, such as a UE device that is communicatively coupled to base station facility 504 but is not equipped with a positioning technology such as RTK positioning technology. In certain examples, system 110 may store the determined base station location data 406 in memory 202 as a part of a base station location data database (e.g., a base station almanac (BSA)) for use as an input in further location data determination processes.

Signal data 602 may represent any information from communication signals transmitted and received between the additional UE device and one or more base station facilities, including the base station facility 504 for which system 110 determined base station location data 406. System 110 may be configured to obtain signal data 602 from any suitable source(s). For example, system 110 may be configured to obtain signal data 602 from any computing system with which system 110 may communicate (e.g., by way of communication network 102 or another network). As another example, system 110 may be configured to obtain signal data 602 by deriving signal data 602 from other data received by system 110. Accordingly, system 110 may obtain signal data 602 by receiving the data from one or more suitable sources and/or by generating the data based on data received from one or more suitable sources.

Based on base station location data 406 and signal data 602, system 110 may determine UE device location data 604 for the additional UE device. Examples of how system 110 may determine a location of the additional UE device based on the locations base stations facilities and communication signals between the additional UE device and the base stations facilities will now be described in reference to FIG. 7.

Figure 7:
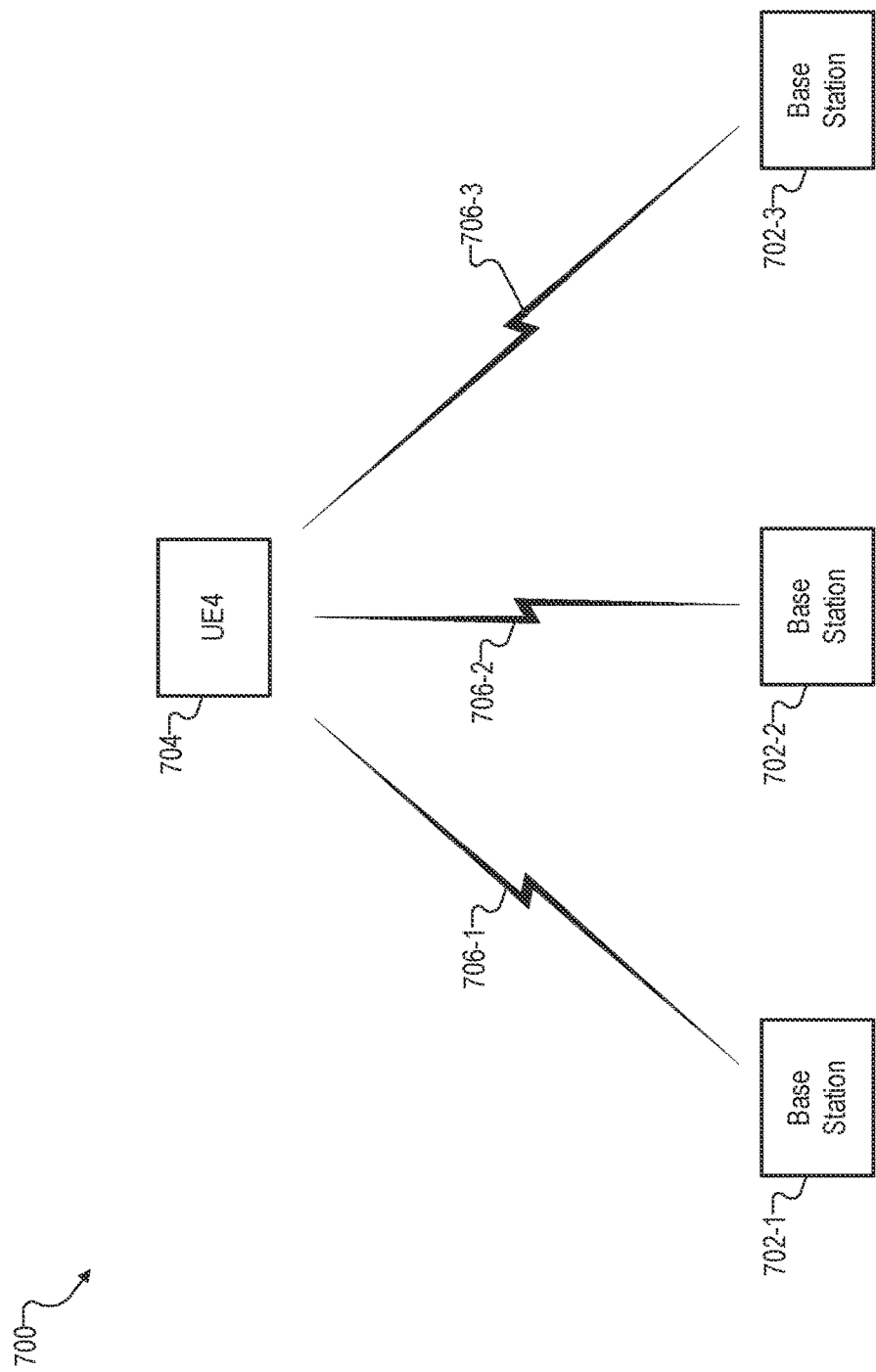
FIG. 7 shows an illustrative configuration for which a location management system may determine a location of a UE device according to embodiments described herein.

FIG. 7 shows an illustrative configuration 700 of certain base station facilities 702-1, 702-2, and 702-3 communicatively coupled to a certain additional UE device 704 by way of communication network 102. In the exemplary embodiment shown, three base station facilities 702-1, 702-2, and 702-3 (collectively base station facilities 702) communicate with UE device 704 by way of communication signals 706-1, 706-2, 706-3, respectively (collectively communication signals 706). Such communications may be by way of communication network 102. In certain embodiments, communication network 102 may include a 5G network, and UE device 704 may be a 5G-enabled UE device for which a sub-meter accurate location is unknown (e.g., a 5G-enabled UE device without RTK capabilities).

System 110 may obtain base station location data representing geographic locations of base station facilities 702 to a sub-meter level of accuracy. This may be performed in any suitable way and may support any combination of RTK-enabled and non-RTK-enabled base station facilities in base station facilities 702. In some examples, all of the base station facilities 702 may be RTK-enabled. In other examples, at least one of the base station facilities 702 may not be RTK-enabled, and system 110 may determine a sub-meter accurate location of that base station facility 702 or those base station facilities 702 that are not RTK-enabled in any of the ways described above. Accordingly, although a base station facility 702 is not RTK-enabled, system 110 may determine and use a sub-meter accurate location of that base station facility 702, together with other sub-meter accurate locations of other base stations 702 to which UE device 704 is communicatively coupled to determine a sub-meter accurate location of UE device 704. System 110 may make this determination in any of the ways described herein based on the locations of at least three base station facilities 702 and information from communication signals 706 between additional UE device 704 and the base station facilities 702, such as using any of the reference signals, timing measurements, algorithms (5G reference signal timing and angle algorithms), distance determinations, signal angles, equations, trilateration processes, triangulation processes, etc. described above. Accordingly, system 110 may determine base station location data for at least three base station facilities 702 (first, second, and third base stations facilities 702-1, 702-2, and 702-3), obtain signal data representing information from communication signals 706 communicated between mobile UE device 704 and the base station facilities 702, and determine, based on the base station location data and the signal data, a location of UE device 704 to at least a sub-meter level of accuracy in any of the ways described herein.

In certain examples, system 110 may be configured to determine timing offsets between base station facilities. The timing offsets may represent time synchronization errors between the base station facilities. Accordingly, system 110 and/or one or more elements of communication network 102 may use the offsets to correct for synchronization errors between the base station facilities. Examples of system 110 determining and applying such timing offsets will now be described.

When locations of at least three base station facilities and a location of a UE device communicatively coupled to the base station facilities are known (e.g., from RTK positioning and/or determined as described herein) to a suitable level of accuracy (to at least a defined threshold level of accuracy), system 110 may determine timing offsets between the base station facilities. For example, system 110 may determine timing offsets between base station facilities 702 when UE device 704 is communicatively coupled to base station facilities 702 and the locations of UE device 704 and base station facilities 702 are known to a suitable level of accuracy. Examples of operations that may be performed by system 110 to determine timing offsets between base station facilities 702 will now be described. In the examples, the location of UE device 704 may be represented as x, y, z coordinates, the location of base station facility 702-1 may be represented as x1, y1, z1 coordinates, the location of base station facility 702-2 may be represented as x2, y2, z2 coordinates, and the location of base station facility 702-3 may be represented as x3, y3, z3 coordinates.

In certain examples, system 110 may use communication signals 706 between UE device 704 and base station facilities 702 to measure actual time of travel of signals between UE device 704 and base station facilities 702. For example, system 110 may use 5G NR SRS signals to determine signaling times from UE device 704 to base station facilities 702. The measured actual time between UE device 704 and base station facility 702-1 may be denoted as MT1, the measured actual time between UE device 704 and base station facility 702-2 may be denoted as MT2, and the measured actual time between UE device 704 and base station facility 702-1 may be denoted as MT3.

System 110 may then determine time differences between the measured actual times of the communication signals 706. These time differences may be denoted as Mdiff12 for the difference between base station facilities 702-1 and 702-2, as Mdiff23 for the difference between base station facilities 702-2 and 702-3, and as Mdiff13 for the difference between base station facilities 702-1 and 702-3. The time differences may be determined by subtracting a measured actual time associated with one base station facility 702 from a measured actual time associated with another base station facility 702, such as with the following equations:

$$Mdiff12 = MT1 - MT2$$

$$Mdiff23 = MT2 - MT3$$

$$Mdiff13 = MT1 - MT3.$$

System 110 may determine estimated times of travel of communication signals 706 between UE device 704 and base station facilities 702 based on the locations of UE device 704 and base station facilities 702. For example, based on the locations, system 110 may determine distances between UE device 704 and base station facilities 702 based on the following equations:

$$D1^2=(x-x1)^2+(y-y1)^2+(z-z1)^2$$

$$D2^2=(x-x2)^2+(y-y2)^2+(z-z3)^2$$

$$D3^2=(x-x3)^2+(y-y3)^2+(z-z3)^2,$$

where D1 is the distance between UE device 704 and base station facility 702-1, D2 is the distance between UE device 704 and base station facility 702-2, and D3 is the distance between UE device 704 and base station facility 702-3.

Based on the distances and the speed of light, system 110 may then determine estimated times of signal travel between UE device 704 and base station facilities 702. For example, system 110 may determine estimated times based on the following equations:

$$ET1=D1/C$$

$$ET2=D2/C$$

$$ET3=D3/C,$$

where C is the speed of light, ET1 is the estimated time between UE device 704 and base station facility 702-1, ET2 is the estimated time between UE device 704 and base station facility 702-3, and ET3 is the estimated time between UE device 704 and base station facility 702-3.

System 110 may then determine estimated time differences (e.g., expected time differences) between the estimated times of travel of the communication signals 706. These time differences may be denoted as Ediff12 for the difference between base station facilities 702-1 and 702-2, as Ediff23 for the difference between base station facilities 702-2 and 702-3, and as Ediff13 for the difference between base station facilities 702-1 and 702-3. The time differences may be determined by subtracting an estimated time associated with one base station facility 702 from an estimated time associated with another base station facility 702, such as with the following equations:

$$Ediff12=ET1-ET2$$

$$Ediff23=ET2-ET3$$

$$Ediff13=ET1-ET3.$$

System 110 may determine timing offsets between base station facilities 702 by taking the difference between the measured and the estimated time differences. For example, the timing offsets may be determined based on the following equations:

$$Offset12=Mdiff12-Ediff12$$

$$Offset23=Mdiff23-Ediff23$$

$$Offset13=Mdiff13-Ediff13,$$

where Offset12 is the timing offset between base station facilities 702-1 and 702-2, Offset23 is the timing offset between base station facilities 702-2 and 702-3, and Offset13 is the timing offset between base station facilities 702-1 and 702-3.

System 110 and/or one or more elements of communication network 102 may be configured to use the timing offsets in any suitable way. For example, system 110 may provide (e.g., store) the timing offsets for use to correct for timing synchronization errors between base station facilities 702.

Examples of using to timing offsets to correct for timing synchronization errors will now be described.

System 110 may determine UE device location data (e.g., x, y, z) representing a location of a UE device based on the base station location data for three base station facilities (e.g., x1, y1, z1; x2, y2, z2; x3, y3, z3, respectively) and time differences from received communication signals that are received at the three base station facilities at a particular time (e.g., T1, T2, T3, respectively). System 110 may solve the following equations to determine the UE device location data, where T0 is a particular time the signals are sent from the UE device to the three base station facilities and can be used as a reference time of 0:

$$(C(T1-T0))^2=(x-x1)^2+(y-y1)^2+(z-z1)^2$$

$$(C(T2-T0))^2=(x-x2)^2+(y-y2)^2+(z-z2)^2$$

$$(C(T3-T0))^2=(x-x3)^2+(y-y3)^2+(z-z3)^2,$$

where C is the speed of light.

System 110 may then solve the following equations to correct for timing synchronization errors between the base station facilities:

$$(C(T1))^2=(x-x1)^2+(y-y1)^2+(z-z1)^2=D1^{*2}$$

$$(C(T2-Offset12))^2=(x-x2)^2+(y-y2)^2+(z-z2)^2=D2^{*2}$$

$$(C(T3-Offset13))^2=(x-x3)^2+(y-y3)^2+(z-z3)^2=D3^2.$$

In this or a similar manner, system 110 may use timing offsets to correct synchronization errors. The timing offsets may be applied in other ways in other examples. System 110 may provide (e.g., store) this UE device location data (e.g., x, y, z) for use by system 110 and/or one or more elements of communication network 102 (e.g., in memory 202 as a part of an updated UE device location data database).

In certain examples, timing offsets may be used by system 110 to determine locations of UE devices to within one or more centimeters of accuracy. The timing offsets may be used to tune the communication network 102 for location-based services of the communication network 102. The timing offsets may improve location determination using only certain signals received from UE devices (e.g., only network received reference times such as reference times carried in 5G NR-SRS signals). No additional information may be needed from a UE device.

Figure 8:
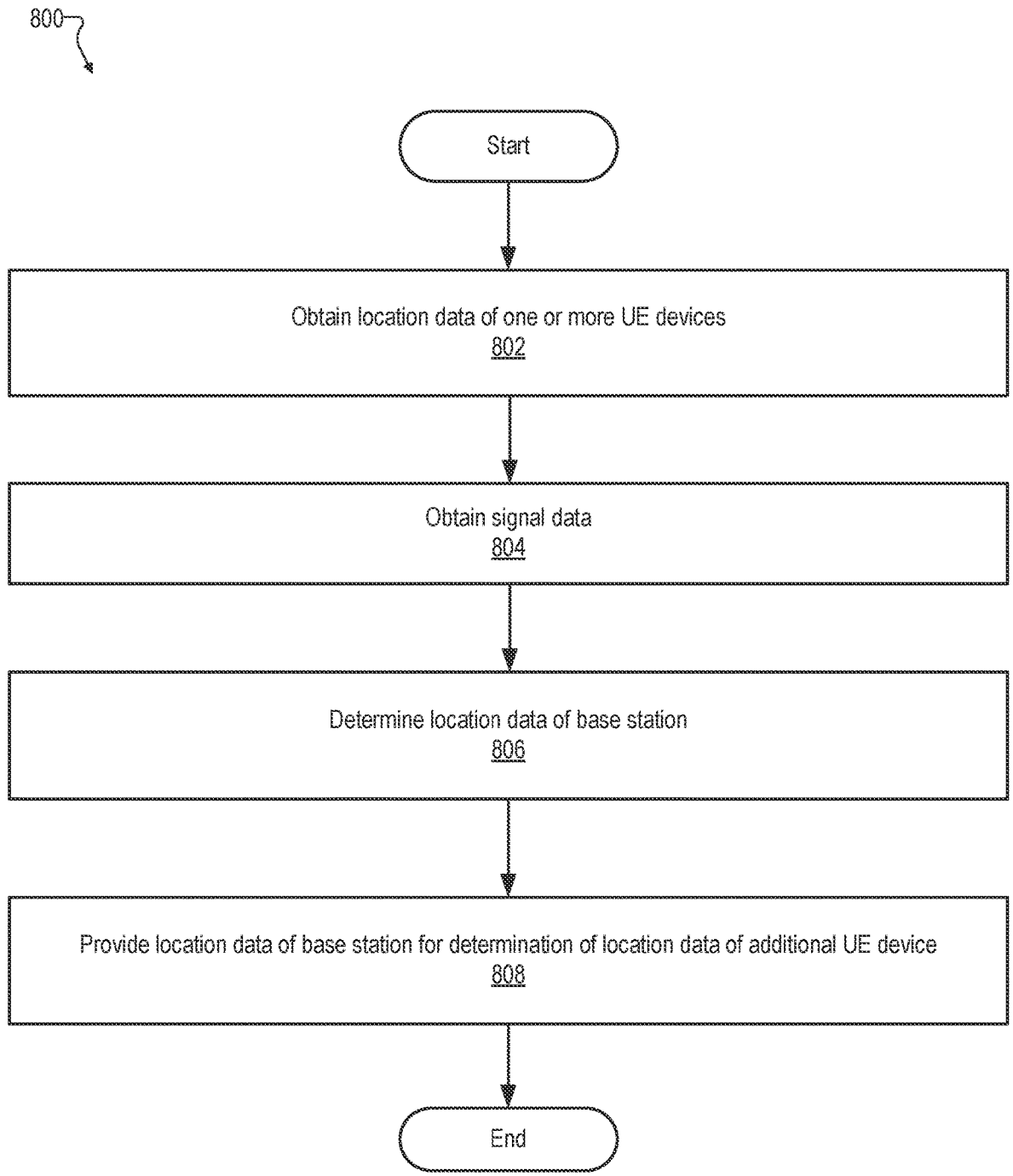
FIGS. 8-10 show illustrative methods according to embodiments described herein.
Figure 9:
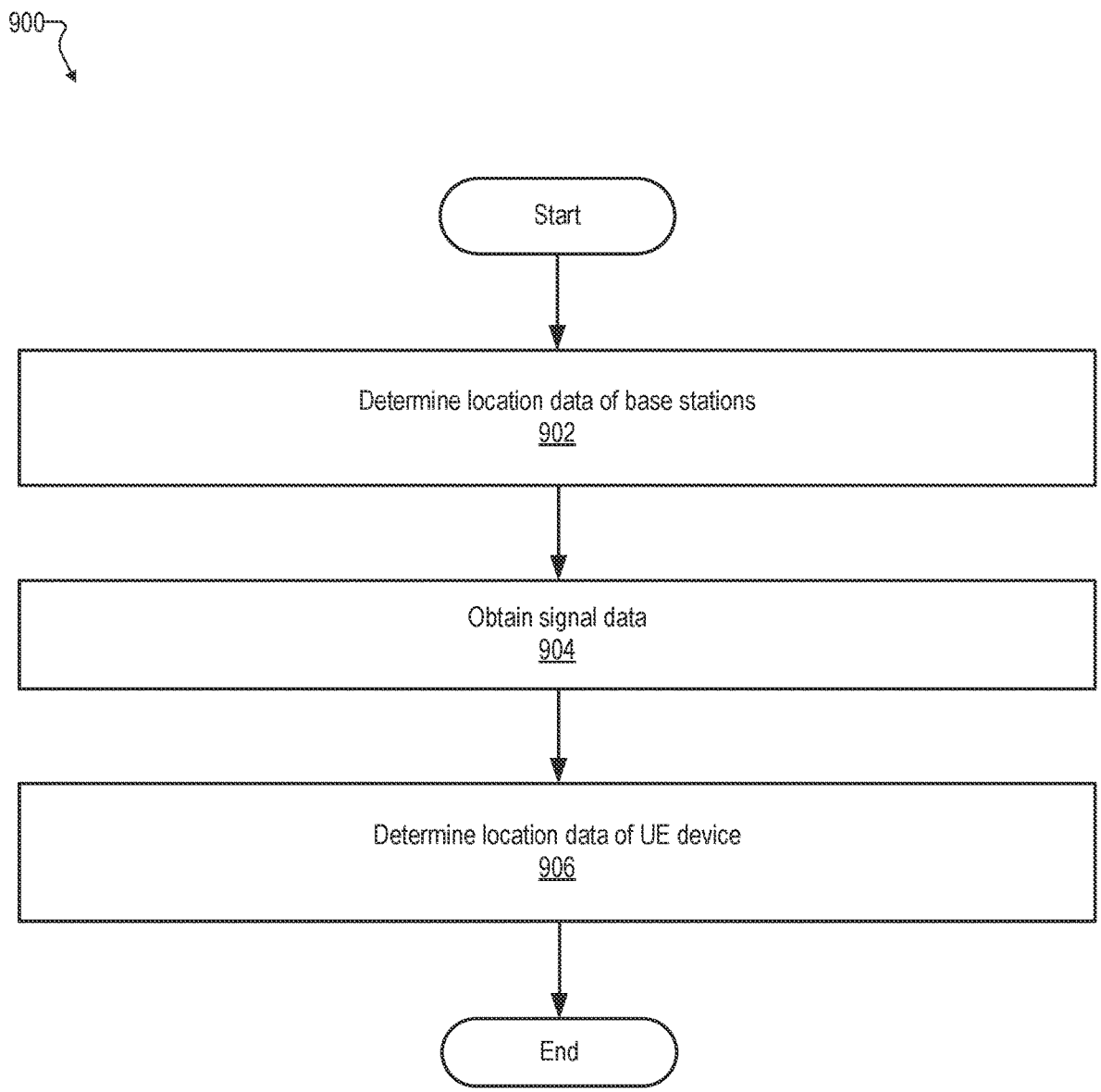
Figure 10:
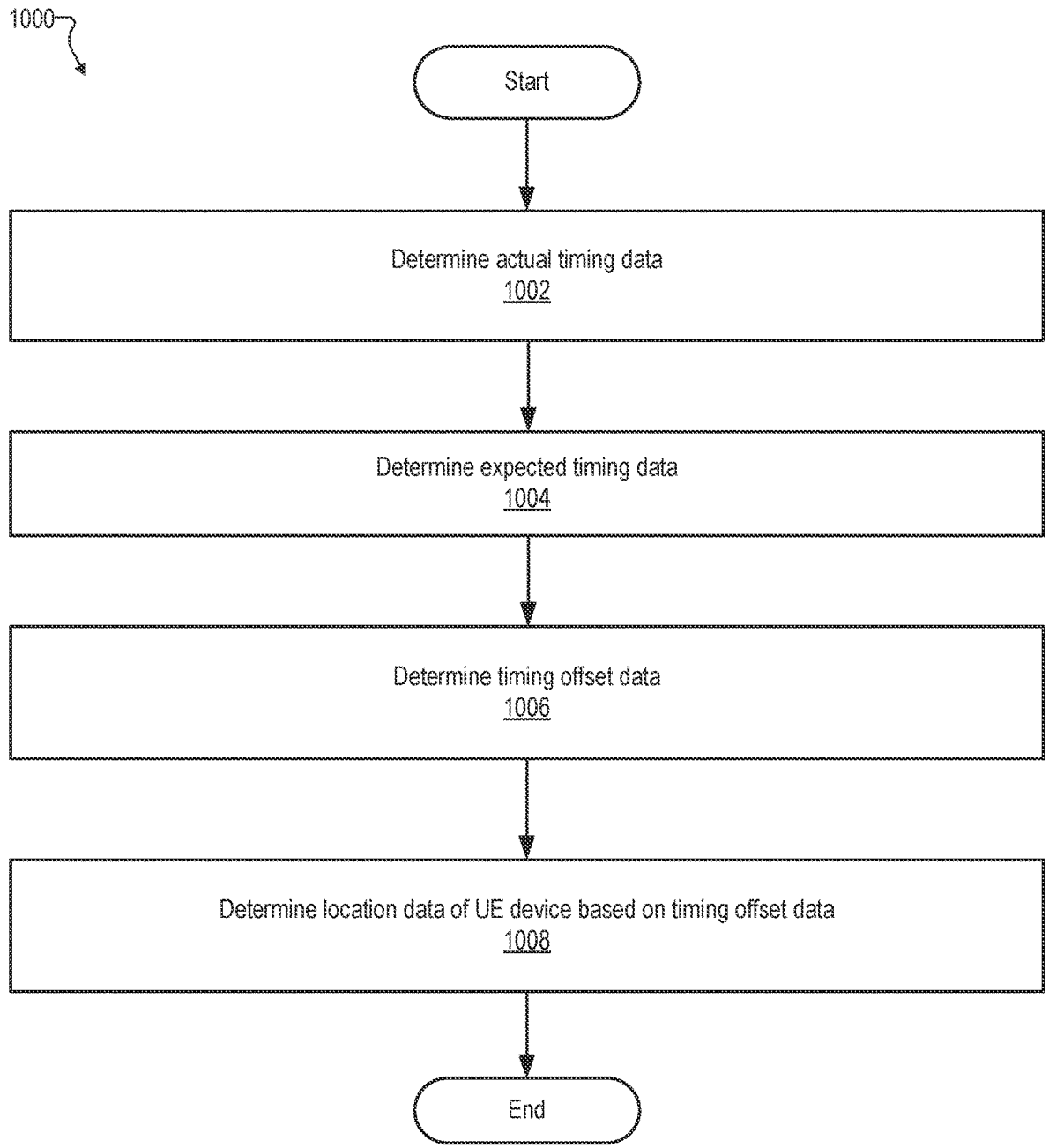

FIGS. 8-10 illustrate example methods 800, 900, 1000, respectively. While FIGS. 8-10 illustrate example operations according to certain embodiments, other embodiments may omit, add to, reorder, combine, and/or modify any of the operations shown in FIGS. 8-10. In some examples, multiple operations shown in FIGS. 8-10 or described in relation to FIGS. 8-10 may be performed concurrently (e.g., in parallel) with one another, rather than being performed sequentially as illustrated and/or described. One or more of the operations shown in FIGS. 8-10 may be performed by a location management system such as system 110 and/or any implementation thereof.

With reference to FIG. 8, in operation 802, a location management system obtains location data of one or more UE devices. In some examples, the location data of UE devices may be location data representing, to a sub-meter level of accuracy, at least three different geographical locations of one or more mobile UE devices communicatively coupled to a base station facility of a wireless communication network. Operation 802 may be performed in any of the ways described herein.

In operation 804, the location management system obtains signal data. The signal data may represent information from signals communicated between a base station facility and the one or more UE devices by way of the communication network. Operation 804 may be performed in any of the ways described herein.

In operation 806, the location management system determines location data of the base station facility. The location management system may determine the location data based on the signal data and the UE location data of the one or more mobile UE devices, as described herein. In some examples, the location data of the base station facility may be base station location data representing, to the sub-meter level of accuracy, a geographical location of the base station facility of the communication network. Operation 806 may be performed in any of the ways described herein.

In operation 808, the location network management system provides the location data of the base station facility for use in determining location data of an additional UE device. In some examples, the location data of the additional UE device may be location data representing, to the sub-meter level of accuracy, a location of the additional UE device communicatively coupled to the base station facility. Operation 808 may be performed in any of the ways described herein.

With reference to FIG. 9, in operation 902, a location management system determines location data of base station facilities. In some examples, the location data of the base station facilities may be location data representing, to a sub-meter level of accuracy, geographical location of at least three base station facilities. In certain examples, one or more locations of one or more of the base station facilities may be determined by the location management system performing method 800 of FIG. 8. Additionally or alternatively, one or more locations of one or more of the base station facilities may be determined in one or more other suitable ways, such as by way of a positioning technology (e.g., RTK positioning technology) deployed at one or more of the base station facilities. Operation 902 may be performed in any of the ways described herein.

In operation 904, the location management system obtains signal data. In some examples, a UE device may be communicatively coupled to at least three base station facilities having sub-meter location data obtained by the location management system. The signal data may represent information from signals communicated between the UE device and the three base station facilities by way of the communication network. Operation 904 may be performed in any of the ways described herein.

In operation 906, the location management system determines location data of the UE device. The location management system may determine the location data of the UE device based on the signal data and the base station location data representing the locations of the base station facilities. In some examples, the location data of the UE device may be location data representing, to the sub-meter level of accuracy, the geographical location of the UE device. Operation 906 may be performed in any of the ways described herein.

With reference to FIG. 10, in operation 1002, a location management system determines actual timing data. In some examples, the actual timing data may be determined based on signal data representing information from signals communicated between a UE device and at least three base station facilities. The actual timing data may represent times of travel of the signals. Operation 1002 may be performed in any of the ways described herein.

In operation 1004, the location management system determines expected timing data. In some examples, the expected timing data may be determined based on location data representing the locations of the UE device and the three base station facilities. Operation 1004 may be performed in any of the ways described herein.

In operation 1006, the location management system determines timing offset data. In some examples, the timing offset data may be determined based on a difference determination between the actual timing data and the expected timing data, as described herein. Operation 1006 may be performed in any of the ways described herein.

In operation 1008, the location network management system determines location data of a UE device based on the timing offset data. In some examples, the location data of the UE device may be location data representing, to the sub-meter level of accuracy, a location of the UE device communicatively coupled to the three base station facilities. Operation 1008 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
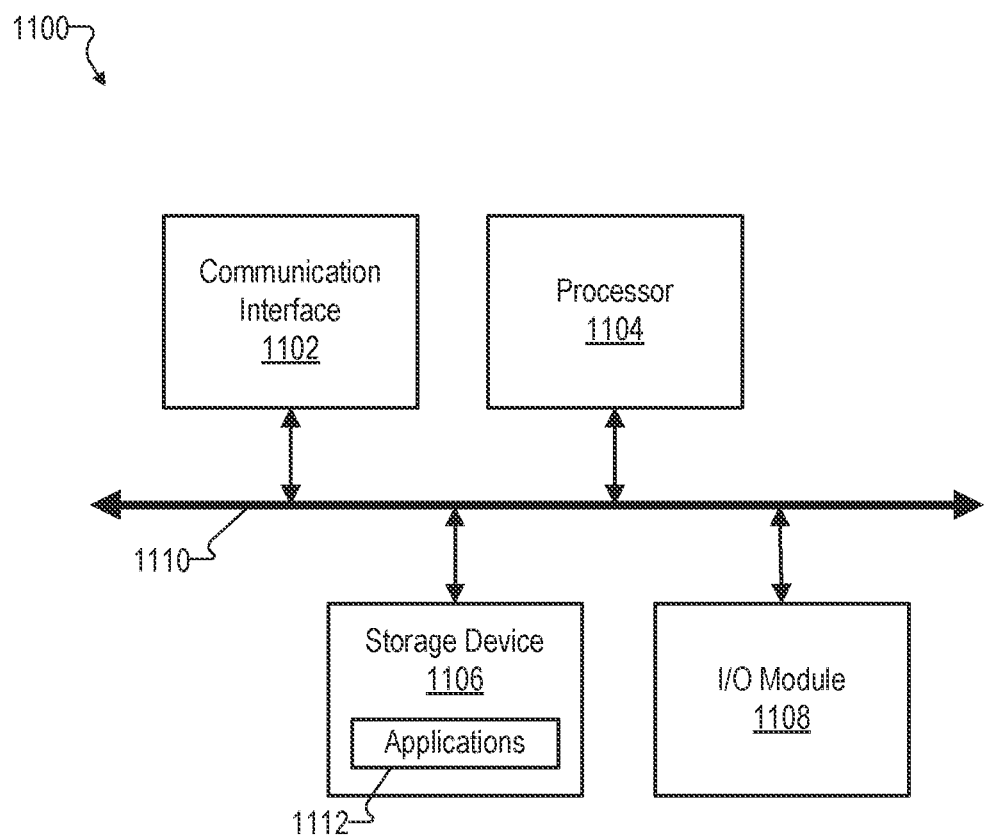
FIG. 11 shows an illustrative computing device according to embodiments described herein.

FIG. 11 shows an illustrative computing device 1100 that may be specifically configured to perform one or more of the processes described herein. For example, computing device 1100 may include or implement (or partially implement) a location management system such as system 110 or may correspond to any component included communication network 102 (e.g., network equipment such as network equipment 104, a UE device such as UE device 108, etc.), or any other computing systems or devices described herein.

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more other computing devices and/or systems. Examples of communication interface 1102 may include, without limitation, a wired network interface (such as a network interface card), a wireless network interface (such as a wireless network interface card), a modem, an audio/video connection, and any other suitable interface. In a case where computing device 1100 may correspond to a UE device 108, communication interface 1102 may include a wireless transceiver (including at least one antenna) for communicating with one or more base station facilities 106. In some implementations, communication interface 1102 may include a GPS interface and/or a RTK interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium. Processor 1104 may include software, hardware, or a combination of software and hardware for executing the processes described herein.

Storage device 1106 may include one or more data storage media, devices, or configurations and may employ any type, form, and combination of data storage media and/or device that may store information and, in some implementations, instructions for execution by processor 1104. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations and/or execute any of the instructions described herein may be stored within storage device 1106. In some examples, data may be arranged in one or more databases residing within storage device 1106. Storage device 1106 may be referred to herein as a "non-transitory computer-readable medium" or a "non-transitory storage medium."

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

Computing device 1100 may perform certain operations, including one or more of the exemplary operations described herein. Computing device 1100 may perform these operations in response to processor 1104 executing software instructions contained in a computer-readable medium, such as storage device 1106. A computer-readable medium may be defined as a physical or logical memory device. A logical memory device may include memory space within a single physical memory device or spread across multiple physical memory devices. The software instructions may be read into storage device 1106 from another computer-readable medium or from another device via communication interface 1102. The software instructions contained in storage device 1106 may cause processor 1104 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of computing device 1100 illustrated in FIG. 11 is for illustrative purposes only. Other configurations may be implemented. Therefore, computing device 1100 may include additional, fewer, and/or different components, arranged in a different configuration, than depicted in FIG. 11.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   obtaining, by a location management system, user equipment (UE) location data representing at least three different locations of one or more mobile UE devices communicatively coupled to a base station facility of a wireless communication network;
   obtaining, by the location management system, signal data representing information from signals communicated between the base station facility and the one or more mobile UE devices by way of the wireless communication network;

determining, by the location management system based on the signal data and the UE location data, base station location data representing a location of the base station facility;

determining, by the location management system, base station location data representing a location of a second base station facility and a location a third base station facility, wherein an additional mobile UE device is communicatively coupled to the base station facility, the second base station facility, and the third base station facility;

obtaining, by the location management system, signal data representing information from signals communicated between the additional mobile UE device and the base station facility, the second base station facility, and the third base station facility; and determining, based on the base station location data representing the locations of the base station facility, the second base station facility, and the third base station facility and on the signal data representing information from signals communicated between the additional mobile UE device and the base station facility, the second base station facility, and the third base station facility, a location of the additional mobile UE device.

2. The method of claim 1, further comprising:
providing, by the location management system, the base station location data for use in determining a location of another mobile UE device communicatively coupled to the base station facility.

3. The method of claim 1, wherein the determining the base station location data comprises:
determining, based on the signal data, a distance between the base station facility and each of the one or more mobile UE devices; and
determining, based on the distance between the base station facility and each of the one or more mobile UE devices, the base station location data representing the location of the base station facility.

4. The method of claim 1, wherein the determining the base station location data comprises:
determining, based on the signal data, angles of the signals communicated between the base station facility and the one or more mobile UE devices; and
determining, based on the angles of the signals, the base station location data representing the location of the base station facility.

5. The method of claim 1, wherein the determining the base station location data comprises:
determining, based on the signal data, a combination of distances between the base station facility and the one or more mobile UE devices and angles of the signals communicated between the base station facility and the one or more mobile UE devices; and
determining, based on the combination, the base station location data representing the location of the base station facility.

6. The method of claim 1, further comprising:
determining, by the location management system, actual timing data based on signal data representing information from signals communicated between one of the one or more mobile UE devices and the base station facility, second base station facility, and third base station facility;
determining, by the location management system, expected timing data based on the UE location data representing the location of the one of the one or more mobile UE devices and the base station location data representing the locations of the base station facility, second base station facility, and third base station facility; and
determining, by the location management system, timing offset data based on a difference determination between the actual timing data and the expected timing data;
wherein the determining the location of the additional mobile UE device is based on the timing offset data.

7. The method of claim 1, wherein:
the one or more mobile UE devices implement a real time kinematic (RTK) positioning technology; and
the at least three different locations of the one or more mobile UE devices are determined with the RTK positioning technology.

8. The method of claim 1, wherein the signals communicated between the base station facility and the one or more mobile UE devices comprise 5G service reference signals.

9. The method of claim 1, wherein:
the one or more mobile UE devices are equipped with a positioning technology used to determine the at least three different locations of the one or more mobile UE devices to a sub-meter level of accuracy; and
the base station facility is not equipped with the positioning technology.

10. A system comprising:
a memory storing instructions; and
a processor communicatively coupled to the memory and configured to execute the instructions to:
obtain user equipment (UE) location data representing at least three different locations of one or more mobile UE devices communicatively coupled to a base station facility of a wireless communication network;
obtain signal data representing information from signals communicated between the base station facility and the one or more mobile UE devices by way of the wireless communication network;
determine, based on the signal data and the UE location data, base station location data representing a location of the base station facility;
determine base station location data representing a location of a second base station facility and a location a third base station facility, wherein an additional mobile UE device is communicatively coupled to the base station facility, the second base station facility, and the third base station facility;
obtain signal data representing information from signals communicated between the additional mobile UE device and the base station facility, the second base station facility, and the third base station facility; and
determine, based on the base station location data representing the locations of the base station facility, the second base station facility, and the third base station facility and on the signal data representing information from signals communicated between the additional mobile UE device and the base station facility, the second base station facility, and the third base station facility, a location of the additional mobile UE device.

11. The system of claim 10, wherein the determining the base station location data comprises:
determining, based on the signal data, a distance between the base station facility and each of the one or more mobile UE devices; and
determining, using trilateration and based on the distance between the base station facility and each of the one or more mobile UE devices, the base station location data representing the location of the base station facility.

12. The system of claim 10, wherein the determining the base station location data comprises:
   determining, based on the signal data, angles of the signals communicated between the base station facility and the one or more mobile UE devices; and
   determining, using triangulation and based on the angles of the signals, the base station location data representing the location of the base station facility.

13. The system of claim 10, wherein the processor is configured to execute the instructions to:
   determine actual timing data based on signal data representing information from signals communicated between one of the one or more mobile UE devices and the base station facility, second base station facility, and third base station facility;
   determine expected timing data based on the UE location data representing the location of the one of the one or more mobile UE devices and the base station location data representing the locations of the base station facility, second base station facility, and third base station facility; and
   determine timing offset data based on a difference determination between the actual timing data and the expected timing data;
   wherein the determining the location of the additional mobile UE device is based on the timing offset data.

14. The system of claim 10, wherein:
   the one or more mobile UE devices are equipped with a positioning technology used to determine the at least three different locations of the one or more mobile UE devices to a sub-meter level of accuracy;
   the base station facility is not equipped with the positioning technology; and
   the additional mobile UE device is not equipped with the positioning technology.

15. The system of claim 10, wherein:
   the one or more mobile UE devices implement a real time kinematic (RTK) positioning technology; and
   the at least three different locations of the one or more mobile UE devices are determined with the RTK positioning technology.

16. The system of claim 10, wherein the signals communicated between the base station facility and the one or more mobile UE devices comprise 5G service reference signals.

17. A non-transitory computer-readable medium storing instructions that, when executed, direct a processor to:
   obtain user equipment (UE) location data representing at least three different locations of one or more mobile UE devices communicatively coupled to a base station facility of a wireless communication network;
   obtain signal data representing information from signals communicated between the base station facility and the one or more mobile UE devices by way of the wireless communication network;
   determine, based on the signal data and the UE location data, base station location data representing a location of the base station facility;
   determine base station location data representing a location of a second base station facility and a location a third base station facility, wherein an additional mobile UE device is communicatively coupled to the base station facility, the second base station facility, and the third base station facility;
   obtain signal data representing information from signals communicated between the additional mobile UE device and the base station facility, the second base station facility, and the third base station facility; and
   determine, based on the base station location data representing the locations of the base station facility, the second base station facility, and the third base station facility and on the signal data representing information from signals communicated between the additional mobile UE device and the base station facility, the second base station facility, and the third base station facility, a location of the additional mobile UE device.

18. The non-transitory computer-readable medium of claim 17, wherein:
   the UE location data represents the at least three different locations of the one or more mobile UE devices determined with a real time kinematic (RTK) positioning technology; and
   the signals comprise 5G new radio service reference signals (NR-SRS).

19. The non-transitory computer-readable medium of claim 17, wherein the determining the base station location data comprises:
   determining, based on the signal data, a distance between the base station facility and each of the one or more mobile UE devices; and
   determining, using trilateration and based on the distance between the base station facility and each of the one or more mobile UE devices, the base station location data representing the location of the base station facility.

20. The non-transitory computer-readable medium of claim 17, wherein the determining the base station location data comprises:
   determining, based on the signal data, angles of the signals communicated between the base station facility and the one or more mobile UE devices; and
   determining, using triangulation and based on the angles of the signals, the base station location data representing the location of the base station facility.

* * * * *